United States Patent Office.

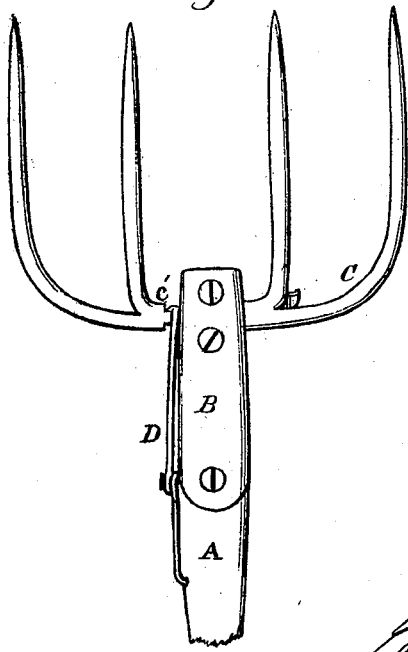
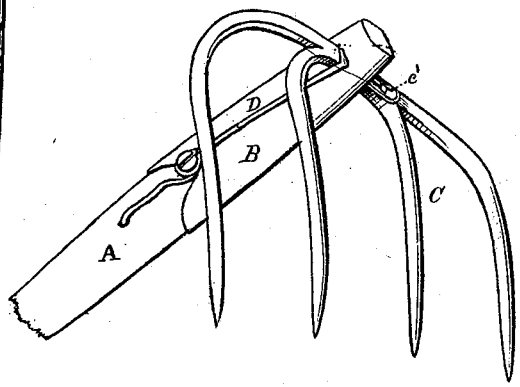
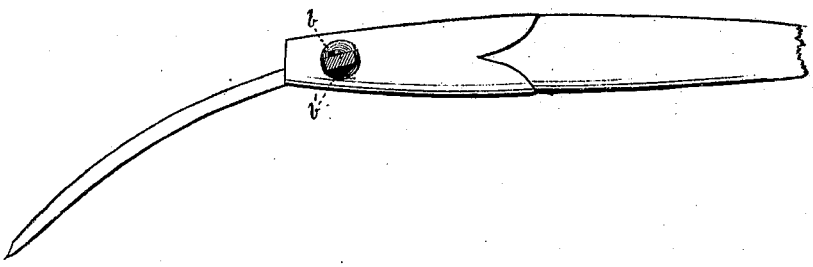

THOMAS W. PEIRCE, OF MINNEAPOLIS, MINNESOTA.

Letters Patent No. 107,531, dated September 20, 1870.

IMPROVEMENT IN HAY-FORKS AND HOOKS.

The Schedule referred to in these Letters Patent and making part of the same.

*To all whom it may concern:*

Be it known that I, THOMAS W. PEIRCE, of Minneapolis, in the county of Hennepin and in the State of Minnesota, have invented a new and useful Improvement in Hay-Forks; and do hereby declare that the following description, taken in connection with the accompanying drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of implements which may be used either as a fork or rake; and Its nature consists in certain modifications and improvements in the construction of the same, hereinafter described and shown.

In the accompanying drawing, which illustrates my invention, and forms a part of the specification thereof, in which corresponding parts are illustrated by similar letters—

Figure 1 represents a view of the implement when the parts thereof are so arranged as to be used as a fork.

Figure 2 illustrates the implement when used as a rake or drag.

The construction and operation, and relative arrangement of the component parts of my invention, are as follows, to wit:

The handle A is provided with a ferrule, B, through an aperture in the end of which is secured the fork C.

The end of the spring-catch D, attached to the sand-handle, fits between a shoulder cut in the fork and the said ferrule, and thereby prevents the lateral movement of the fork.

In order to hold the fork in position, on one side of the ferrule B is cut an elongated slot, of such a size as to receive shoulders formed on the fork, and the said fork is provided with a pointed slide, which catches in the small indenture $b$.

When it is desirable to transform the fork into a rake, the spring-catch D is lifted, and the shank of the fork moved laterally, until the shoulder $c$ thereof comes in contact with the side of the ferrule B. The tines are then revolved until they assume the position illustrated in fig. 2, in which position they are held by inserting the point of the slide-catch $c'$ in the slot $b'$.

Having thus described the construction and operation of my invention, I will indicate what I claim and desire to secure by Letters Patent, in the following clause:

A combined fork and rake, when comprised of devices constructed to operate together as described; that is to say, the handle A, spring-catch D, perforated ferrule B, fork C, shoulder $c$, and pointed slide-catch $c'$, when arranged together, as and for the purpose described.

In testimony that I claim the foregoing, I have hereunto set my hand this 1st day of February, 1870.

T. W. PEIRCE.

Witnesses:
LORENZO COLEMAN,
STUART SEELY.